(12) United States Patent
Kasap et al.

(10) Patent No.: US 12,715,263 B2
(45) Date of Patent: Aug. 25, 2026

(54) METHOD AND TEST ARRANGEMENT FOR TESTING AN AIR-CONDITIONING UNIT

(71) Applicant: Siemens Mobility GmbH, Munich (DE)

(72) Inventors: Irfan Kasap, Herne (DE); Markus Schmitz, Langerwehe (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 18/697,533

(22) PCT Filed: Sep. 12, 2022

(86) PCT No.: PCT/EP2022/075205
§ 371 (c)(1),
(2) Date: Apr. 1, 2024

(87) PCT Pub. No.: WO2023/052102
PCT Pub. Date: Apr. 6, 2023

(65) Prior Publication Data

US 2024/0326551 A1 Oct. 3, 2024

(30) Foreign Application Priority Data

Sep. 30, 2021 (DE) ..................... 10 2021 211 033.9
Jan. 13, 2022 (DE) ..................... 10 2022 200 266.0

(51) Int. Cl.
*B60H 1/00* (2006.01)
*G01M 99/00* (2011.01)
*B61L 15/00* (2006.01)

(52) U.S. Cl.
CPC ...... *B60H 1/00585* (2013.01); *G01M 99/002* (2013.01); *B61L 15/0081* (2013.01)

(58) Field of Classification Search
CPC .... G01N 17/00; G01N 17/002; G01N 17/004; G01N 2203/0226; B60H 1/00585
(Continued)

(56) References Cited

U.S. PATENT DOCUMENTS 6,690,174 B2 2/2004 Sigwart et al.

FOREIGN PATENT DOCUMENTS

CN 201203531 Y * 3/2009
CN 103323281 A * 9/2013
(Continued)

OTHER PUBLICATIONS

Machine translation of CN 103323281 (Year: 2013).*
(Continued)

*Primary Examiner* — Nathaniel J Kolb
(74) *Attorney, Agent, or Firm* — Laurence A. Greenberg; Werner H. Stemer; Ralph E. Locher

(57) ABSTRACT

A method and a test arrangement for testing an air-conditioning unit which is intended to provide conditioned air for a vehicle and which is exposed to solar radiation during the operation of the vehicle. According to the method, the solar radiation is simulated by an artificial light source during the test. The artificial light source is set on the basis of a preliminary test, during which there is a test exposure of a representative location of the air-conditioning unit to light, with thermal-technical properties of the air-conditioning unit at the representative location being known in advance.

8 Claims, 2 Drawing Sheets

(58) Field of Classification Search
USPC .......................................................... 73/865.9
See application file for complete search history.

(56) References Cited

FOREIGN PATENT DOCUMENTS

| | | | | | |
|---|---|---|---|---|---|
| CN | 109238953 | A | * | 1/2019 | ........... G01N 17/004 |
| DE | 29903255 | U1 | | 5/1999 | |
| DE | 10155245 | A1 | | 5/2003 | |
| DE | 102014116504 | A1 | | 5/2016 | |
| EP | 1202041 | A1 | | 5/2002 | |
| EP | 1760447 | A2 | * | 3/2007 | .......... G01M 99/002 |
| WO | WO 2020035798 | A1 | | 2/2020 | |

OTHER PUBLICATIONS

Machine translation of CN 109238953 (Year: 2019).*
Machine translation of CN 201203531 (Year: 2009).*
Machine translation of EP 1760447 (Year: 2007).*

* cited by examiner

METHOD AND TEST ARRANGEMENT FOR TESTING AN AIR-CONDITIONING UNIT

FIELD AND BACKGROUND OF THE INVENTION

The invention relates to a method and a test arrangement for testing an air-conditioning unit which is intended to provide conditioned ambient air for a vehicle and is exposed to solar radiation during the operation of the vehicle.

It is known in principle that vehicles and vehicle subsystems and components are tested in many ways before they are put into operation. For example, the influence of cold, heat, snowfall, wind, etc. on vehicles is tested before they are put into operation. These different forms of weather can be created artificially.

German utility model specification DE 299 03 255 U1 discloses a stationary climatic wind tunnel in which rail-bound vehicles can be exposed to climatic simulations of rain, snow, light and different temperatures, including with the aid of a heat exchanger and a water injector in the air flow of the wind tunnel. In this case, a rail vehicle is driven into the climatic wind tunnel and the rail vehicle is exposed to the desired climate, such as temperature, humidity, solar radiation, wind speed, etc., from the outside.

SUMMARY OF THE INVENTION

Against this background, it is the object of the invention to improve testing of an air-conditioning unit of this type.

This object is achieved by a method for testing an air-conditioning unit of the type mentioned in the introduction. In the method, solar radiation is simulated during the test by means of an artificial light source. The artificial light source is set on the basis of a preliminary test. In the preliminary test, test irradiation with light is carried out at a representative location of the air-conditioning unit. Herein, thermal properties of the air-conditioning unit at the representative location are known in advance.

The invention is based on the knowledge that, in previous solutions, the influence of solar radiation on the operation of an air-conditioning unit is not determined at all during the development or design of the air-conditioning units, or is only ascertained on the basis of simplified theoretical assumptions. In addition, the influence of solar radiation is generally not tested during the design or development phase of the air-conditioning unit.

As the same time, a great deal of effort and urgency is incurred if it is only discovered during a downstream system test in a climatic wind tunnel, or even during the operation of the vehicle, that the air-conditioning unit does not meet the desired requirements. This is because, in such cases, the air-conditioning unit may have to be uninstalled from the vehicle and modifications made to the air-conditioning unit and this would delay the overall process of approval or the operation of the vehicle.

The solution according to the invention solves this problem by creating a method for testing the air-conditioning unit which can be performed prior to the system test in the climatic wind tunnel. For this upstream test, the influence of solar radiation is simulated by means of an artificial light source. The artificial light source is set to achieve an irradiance corresponding to the downstream test in the climatic wind tunnel. It is set on the basis of a preliminary test. In the preliminary test, test irradiation with light is performed at a representative location of the air-conditioning unit, wherein thermal properties of the air-conditioning unit at the representative location are known in advance. The fact that the thermal properties at the representative location are known enables the test irradiation to be designed according to the solar radiation expected for the system test and the light source to be set accordingly. This makes it possible to test the influence of solar radiation on the mode of operation of the air-conditioning unit prior to the system test in the climatic wind tunnel. This test can, for example, be performed by the supplier of the air-conditioning unit.

The air-conditioning unit is, for example, intended to provide conditioned ambient air for the interior of the vehicle.

Preferably, the air-conditioning unit for the operation of the vehicle is arranged on the roof of the vehicle where it is exposed to solar radiation.

The artificial light source comprises, for example, a light source embodied to emit infrared radiation. For example, the light source comprises an infrared radiator or an infrared lamp.

The wording "test irradiation with light is performed at a representative location of the air-conditioning unit, wherein thermal properties of the air-conditioning unit at the representative location are known in advance" is to be understood as meaning that the selected representative location is a location of the air-conditioning unit (in particular on the surface) for which the thermal properties are known in advance.

According to a preferred embodiment of the method according to the invention, during the test irradiation, a reference temperature is set at the representative location of the air-conditioning unit. The reference temperature represents a temperature that is expected for the use of the air-conditioning unit downstream of the test.

Use downstream of the test can, for example, be the above-described system test in the climatic wind tunnel and/or a further downstream test and/or use of the air-conditioning unit during the operation of the vehicle.

In a further preferred embodiment of the method according to the invention, the reference temperature is ascertained at least on the basis of the thermal properties at the representative location and on the basis of ambient conditions that are expected for the use of the air-conditioning unit downstream of the test.

The ambient conditions comprise, for example, the expected ambient temperatures, wind speeds, light irradiation prevailing, for example, in a climatic wind tunnel used for the downstream test.

The vehicle can be any type of vehicle in which the influence of solar radiation on the vehicle's air-conditioning unit has to be taken into account during operation. An example of a vehicle of this type is a bus in which the air-conditioning unit is arranged on the roof.

According to a preferred embodiment of the method according to the invention, the vehicle is a track-bound vehicle, in particular a rail vehicle.

For example, the track-bound vehicle is a high-speed train for long-distance public transport or a regional train or light rail, streetcar or subway for local public transport. The rail vehicle is for example a multiple unit train.

The method according to the invention is particularly suitable for use in track-bound vehicles. This is because, in vehicles of this type, the associated air-conditioning units are often arranged on the roof of the track-bound vehicle and accordingly particularly exposed to solar radiation. In addition, the requirements of air-conditioning units for track-bound vehicles are high, particularly with regard to the reliability of air-conditioning units.

According to the further preferred embodiment of the method according to the invention, the testing is carried out upstream of a system test in a climatic wind tunnel in which the air-conditioning unit is installed on the vehicle.

The system test in the climatic wind tunnel is, for example, carried out in observance of the specifications in the standards DIN EN 14813, 13129 and/or 14750.

The system test is an example of the above-described use of the air-conditioning unit for which the ambient conditions are known and can be used accordingly when ascertaining the above-described reference temperature. This is because the ambient conditions are at least partially specified by the aforementioned standards for the system test in the climatic wind tunnel. For example, the strength of the solar radiation, that is simulated in the system test is specified by the aforementioned standards.

In a preferred development, the testing comprises a component test in which the air-conditioning unit is tested as a component of the vehicle prior to installation on the vehicle.

The main advantage of the component test is that it can be performed by the supplier of the air-conditioning unit (before it is installed on the vehicle). This enables it to be ascertained at an early stage whether the air-conditioning unit meets the desired requirements taking solar radiation into account.

According to a further preferred embodiment of the method according to the invention, the setting comprises varying a distance between the light source and the air-conditioning unit and/or an electrical input power of the light source.

These are two particularly suitable and expedient options for setting the light source. As the distance of the light source from the air-conditioning unit increases, the radiant power per area (i.e., the irradiance) that hits the air-conditioning unit decreases. The radiant power emitted by the light source increases as the electrical input power of the light source increases.

In a further preferred embodiment of the method according to the invention, the thermal properties comprise a heat transfer coefficient at the representative location.

This enables it to be ascertained how the heat originating from the solar radiation and absorbed by the air-conditioning unit is dissipated into the air-conditioning unit. The dissipation of the heat influences the temperature on the surface of the air-conditioning unit. This enables the temperature on the surface at the representative location to be calculated under specified conditions—such as the ambient temperature, wind speed, light irradiation prevailing in a climatic wind tunnel used for the system test. In this respect, the representative location differs from other locations of the air-conditioning unit where the dissipation of heat at the surface cannot be calculated exactly, for example due to thermal bridges.

The object mentioned in the introduction is furthermore achieved by a test arrangement for testing the air-conditioning unit of the type mentioned in the introduction. The test arrangement comprises an artificial light source, which is configured to simulate solar radiation during the test. Herein, the air-conditioning unit has a representative location at which the thermal properties of the air-conditioning unit are known in advance. The artificial light source can be set on the basis of a preliminary test in which test irradiation with light can be performed at the representative location of the air-conditioning unit.

For advantages, embodiments and details of the test arrangement according to the invention, reference can be made to the above description of the corresponding features of the method according to the invention.

BRIEF DESCRIPTION OF THE FIGURES

An exemplary embodiment of the invention is explained on the basis of the drawings. These show.

DETAILED DESCRIPTION OF THE INVENTION

Figure 1:
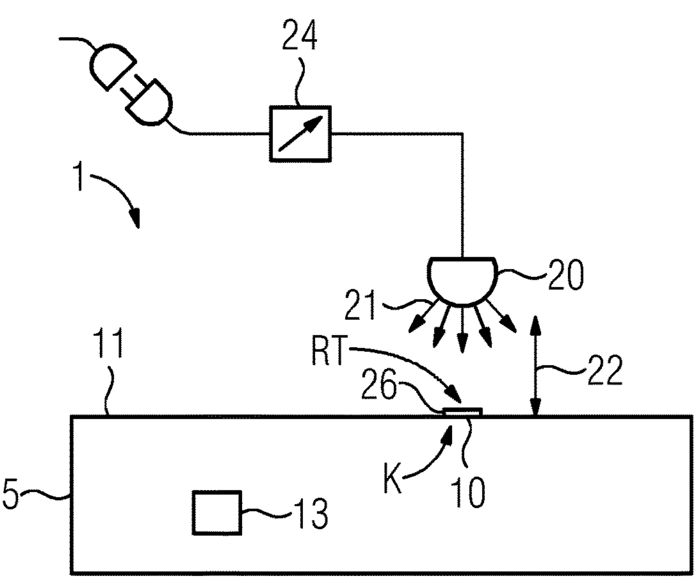
FIG. 1 a schematic structure of an exemplary embodiment of a test arrangement according to the invention for a preliminary test, FIG. 2 a schematic structure of an exemplary embodiment of a test arrangement according to the invention for a component test, FIG. 3 a schematic structure of an exemplary embodiment of a test arrangement according to the invention for a system test and FIG. 4 a schematic course of an exemplary embodiment of a method according to the invention.
Figure 2:
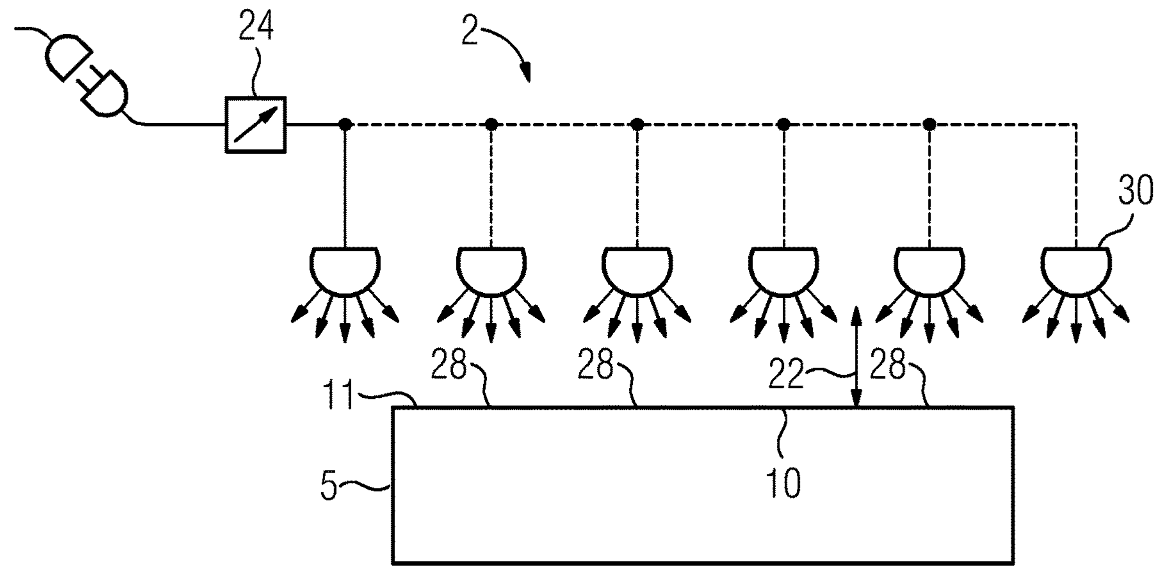
Figure 3:
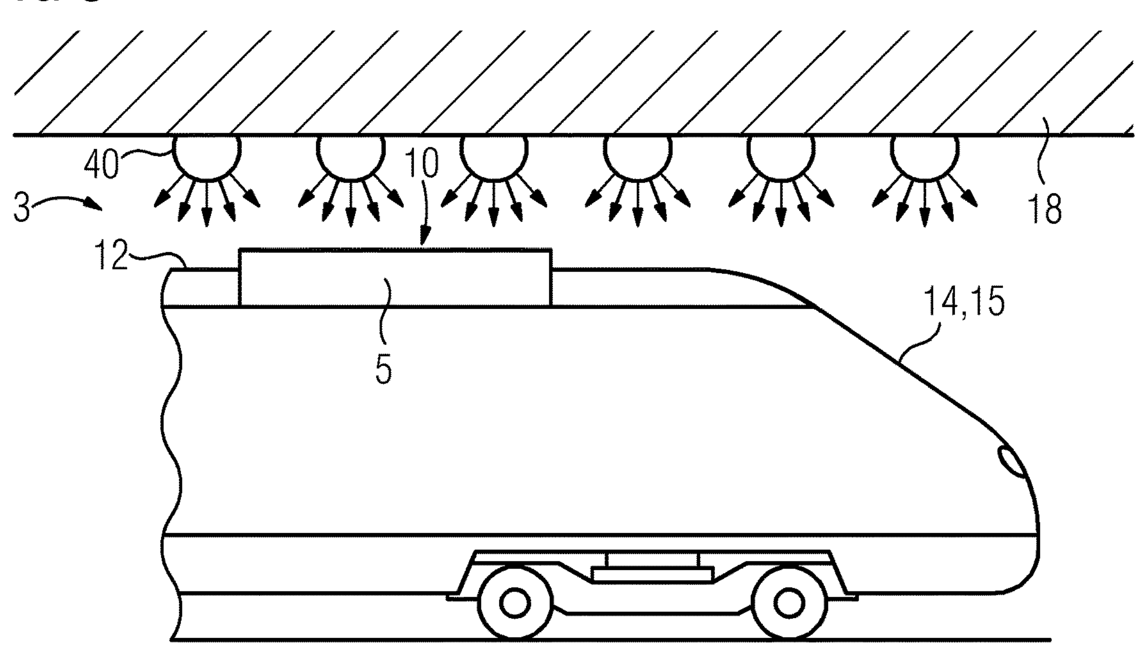
Figure 4:
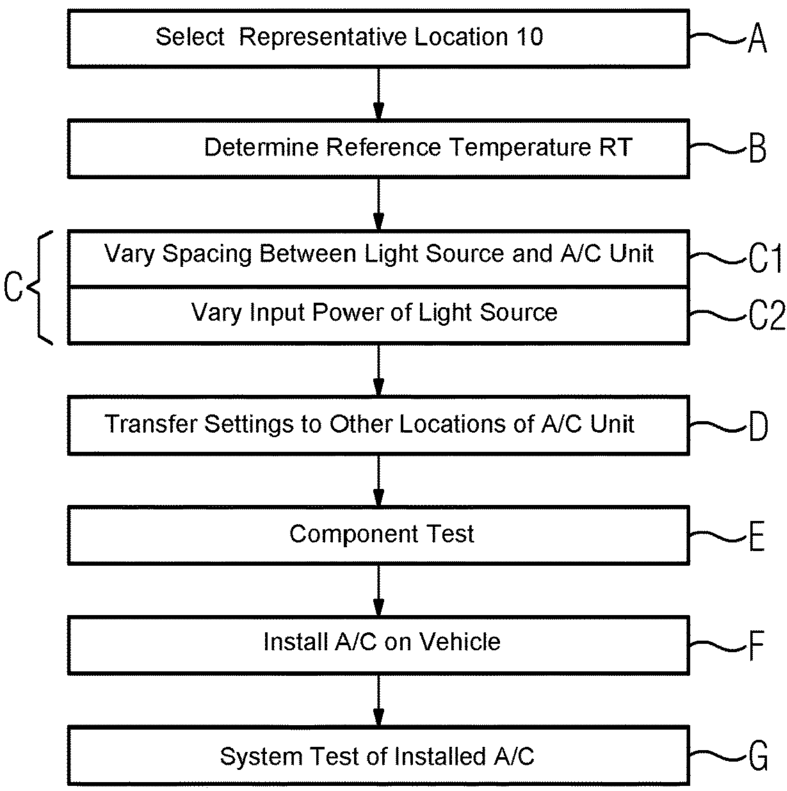

FIG. 1 shows a test arrangement 1 for a preliminary test. FIG. 2 shows a test arrangement 2 for a component test. FIG. 3 shows a test arrangement 3 for a system test. FIG. 4 shows a schematic flow chart representing method steps according to the exemplary embodiment of the method according to the invention.

An air-conditioning unit 5 shown in FIGS. 1 to 3 is configured to provide conditioned ambient air for the interior of a vehicle 14 (FIG. 3). The air-conditioning unit 5 is exposed to solar radiation during the operation of the vehicle 14. The test arrangement 1 is intended for the preliminary test of the air-conditioning unit 5. For this purpose, a representative location 10 on the surface 11 of the air-conditioning unit 5 is selected in method step A.

Thermal properties of this representative location 10 are known in advance from the structure of the air-conditioning unit 5. For example, a heat transfer coefficient K is known for the representative location 10. Accordingly, it is known to what extent heat emitted, for example, to the air-conditioning unit 5 by solar radiation is dissipated into the air-conditioning unit 5.

FIGS. 1 to 3 in particular show a schematic side view of the air-conditioning unit 5, wherein the representative location 10 is selected on the upper surface. In addition, a further representative location 13 is selected on the side of the air-conditioning unit 5. The following describes the exemplary embodiment of the method according to the invention and the test arrangement according to the invention on the basis of the representative location 10. However, the described method and the test arrangement can obviously be transferred to the lateral representative location.

In method step B, a reference temperature RT on the surface 11 of the air-conditioning unit 5 at the representative location 10 is calculated. The reference temperature RI represents a temperature that is expected at the representative location 10 during downstream use of the air-conditioning unit. The use is, for example, the system test or use during the operation of the vehicle 14. Herein, in addition to the thermal properties of the air-conditioning unit 5 at the representative location 10, the expected ambient temperatures, wind speeds, light irradiation prevailing in a climatic wind tunnel 18 used for the system test are known. This information can be used to thermally calculate the temperature RT that is, for example, to be expected at the representative location 10 during the downstream system test (under certain conditions). In addition, it is also possible to calculate a plurality of different reference temperatures RI for different expected conditions that are, for example, expected during the downstream system test. These different reference temperatures RT can, for example, be the subject of a test series during the system test.

The system test is depicted schematically in FIG. 3. Herein, the air-conditioning unit 5 is installed on the roof 12 of a vehicle 14, which is a track-bound vehicle 15.

In method step C, an artificial light source 20 used for the preliminary test (for example, an infrared radiator, which emits infrared radiation 21) is set. The aim of the setting is to set the reference temperature RT at the representative location 10. For this purpose, in method step C1, the distance 22 between the light source 20 and the air-conditioning unit 5 is varied in order in this way to set the irradiance (radiant power per area). Alternatively or additionally, in method step C2, the electrical input power 24 of the light source 20 is varied in order to adjust the radiant power emitted by the light source 20 in this way. These settings (variations) enable the temperature at the surface of the representative location 10 to be adjusted, wherein the adjustment can be monitored using a temperature sensor 26.

The setting ascertained in this way as part of the preliminary test can now be transferred to the component test (FIG. 2). Herein, the ascertained settings are transferred in method step D to further surfaces 28 of the air-conditioning unit 5. This means that, for the component test, a plurality of light sources 30, in each case constructed like the light source 20, are arranged according to the settings ascertained in the preliminary test (see method steps C1 and C2) and supplied with electrical power. As a result, the same irradiance as that set at the representative location in the preliminary test is irradiated onto the further surfaces.

These light sources 30 that have been set are used to perform the component test in method step E. Herein, the air-conditioning unit 5 is operated and the influence of the radiation on the air-conditioning unit 5 is tested. In other words: solar radiation is simulated during the test E by means of the artificial light sources 30.

In method step F, the air-conditioning unit 5 is installed on the vehicle 14. After this installation, a system test can be carried out according to method step G. During the system test, the air-conditioning unit 5 is installed on the roof 12 of the vehicle 14. The vehicle 14 is brought (for example driven) into the climatic wind tunnel 18 and the influence of cold, heat, snowfall, wind, etc. on the vehicle 14 is tested. Herein, the influence of solar radiation is also tested, for example. Solar radiation is simulated by the light sources 40 in the climatic wind tunnel 18.

Although the invention has been illustrated and described in detail by the preferred exemplary embodiment, the invention is not restricted by the disclosed examples and other variations can be derived herefrom by the person skilled in the art without departing from the scope of protection of the invention.

The invention claimed is:

1. A method for testing an operation of an air-conditioning unit, wherein the air conditioning unit is configured to provide conditioned air for a vehicle, the method comprising:

providing an artificial light source configured to simulate solar radiation;

selecting a representative location on a surface of the air-conditioning unit which will be exposed to solar radiation during an operation of the vehicle, wherein thermal properties of the air-conditioning unit at the representative location are known;

in a preliminary test, irradiating the representative location of the air-conditioning unit with the artificial light source and setting a given radiant power of the light source which, when the representative location is irradiated by the light source, results in a reference temperature at the representative location; and monitoring a temperature at the representative location using a temperature sensor during a test irradiation by the artificial light source at the given radiant power, operating the air-conditioning unit and irradiating the representative location on the surface of the air-conditioning unit to simulate the solar radiation expected during a later test of the air-conditioning unit or during an operation of the vehicle, operating the air-conditioning unit and measuring the influence of the irradiation on the operation of the air-conditioning unit.

2. The method according to claim 1, which comprises ascertaining the reference temperature at least on a basis of the thermal properties at the representative location and on a basis of ambient conditions that are expected for the use of the air-conditioning unit after the test irradiation.

3. The method according to claim 1, wherein the vehicle is a rail vehicle.

4. The method according to claim 3, wherein the operation of the air-conditioning unit is tested as a component of the vehicle prior to installation on the vehicle.

5. The method according to claim 1, which comprises performing a system test in a climatic wind tunnel while the air-conditioning unit is installed on the vehicle, after performing the test irradiation.

6. The method according to claim 1, wherein the step of setting the radiant power of the light source comprises at least one of the following:

varying a distance between the light source and the air-conditioning unit; or varying an electrical input power of the light source.

7. The method according to claim 1, wherein the thermal properties comprise a heat transfer coefficient at the representative location.

8. An arrangement, comprising:

an air-conditioning unit and a test arrangement for testing the air-conditioning unit;

a temperature sensor configured to monitor a temperature at the representative location of the air-conditioning unit;

the air-conditioning unit being configured to provide conditioned ambient air for a vehicle, and the air-conditioning unit having a surface which, when the air-conditioning unit is mounted on the vehicle, is exposed to solar radiation during an operation of the vehicle;

the test arrangement comprising:

an artificial light source being configured to simulate solar radiation during a test of the air-conditioning unit;

the surface of the air-conditioning unit having a representative location at which thermal properties of the air-conditioning unit are known; and said artificial light source being configured to be set on a basis of a preliminary test in which the air-conditioning unit is irradiated with light at the representative location and a radiant power of the artificial light source is set as a function of a reference temperature measured by the temperature sensor at the representative location, and the test arrangement being configured to measure the influence of the radiant power on the operation of the air-conditioning unit.

* * * * *